United States Patent [19]

Potier et al.

[11] Patent Number: 5,486,829
[45] Date of Patent: Jan. 23, 1996

[54] METHOD OF COMMUNICATING INFORMATION BETWEEN AN S-MODE SECONDARY RADAR AND A TARGET

[75] Inventors: Eric Potier, Velizy; Michel Wybierala, Versailles, both of France

[73] Assignee: Thomson-CSF, Paris, France

[21] Appl. No.: 271,991

[22] Filed: Jul. 8, 1994

[30] Foreign Application Priority Data

Jul. 9, 1993 [FR] France .................................. 93 08474

[51] Int. Cl.⁶ .................................................. G01S 13/76
[52] U.S. Cl. ........................................ 342/40; 342/37
[58] Field of Search ................................ 342/36, 37, 40, 342/32

[56] References Cited

U.S. PATENT DOCUMENTS

| | | | |
|---|---|---|---|
| 3,696,415 | 10/1972 | Ballantyne | 342/40 |
| 3,761,651 | 8/1988 | Matsunaga | 342/40 |
| 4,710,774 | 12/1987 | Gunny | 342/455 |
| 5,081,457 | 1/1992 | Motisher et al. | 342/40 |

FOREIGN PATENT DOCUMENTS 2680581   2/1993   France .

OTHER PUBLICATIONS

John L. Baker, et al. Mode S System Design And Architecture. Proceedings of the IEEE 77 (1989) Nov., No. 11, New York, US.

Stevens, M. C., "Address Selective Surveillance Radar", Aircraft Engineering, (GB), vol. 52, #4, Apr. 1980.

Primary Examiner—Ian J. Lobo
Attorney, Agent, or Firm—Oblon, Spivak, McClelland, Maier & Neustadt

[57] ABSTRACT

In a method of communicating data between a transmission/reception center and a target, a transaction is constituted by one or more interrogation pulses sent out by the center followed by one or more associated reception windows designed to receive the response from the target that has been sent the associated interrogation pulse. The length of a transaction is the delay between its interrogation pulse and its reception window, the transactions are classified and positioned according to their distances from the radar in decreasing order. The reception window of each transaction is transmitted immediately before the window of the immediately lower-ranking transaction so long as its associated pulse does not overlap an interrogation pulse of a transaction. If the contrary is the case, the transaction is shifted within the previously-transmitted transactions until it no longer overlaps an interrogation pulse or a reception window of these previously-transmitted transactions, the transaction being transmitted after all the previously-transmitted windows if a place without overlapping is not found in this way.

7 Claims, 5 Drawing Sheets

METHOD OF COMMUNICATING INFORMATION BETWEEN AN S-MODE SECONDARY RADAR AND A TARGET

BACKGROUND OF THE INVENTION

The present invention relates to a method for communicating information between an S-mode secondary radar and aircraft. More generally, it can be applied to all types of transactions between a transmission/reception system and detected targets.

A transaction between an S-mode secondary radar and an aircraft consists of several electromagnetic pulses representing a selective interrogation sent out by the radar to the aircraft followed by a reception window enabling the reception system of the radar to receive the response sent by the aircraft following the interrogating transmission. The time lag between the interrogation pulse and the reception window depends notably on the distance from the aircraft to the radar. The time taken up by a selective interrogation will range, for example, from 20 μs to 50 μs while the time taken up by a response may be of the order of 85 μs to 136 μs. In a period for the selective interrogation of data elements lasting some milliseconds for example, an S-mode secondary radar generally needs to process several transactions, the aircraft having undergone prior detection and their positions being defined for example by prediction. With these aircraft being detected and their distances from the radar being known, the transactions pertaining to them need to be programmed notably in the above-mentioned given period. However, since the radar antenna is used in transmission and in reception, the interrogation pulses and the windows must not overlap. Since the lengths of the transactions are different and since this overlapping cannot take place, the transactions generally do not fill the periods of time allocated to them in an optimal way because, to prevent overlapping and take account of the different lengths of the transactions, there are varying periods of time between the interrogation pulses or between the reception windows.

Now, air traffic is becoming increasingly dense with peaks of density in certain zones such as airports for example. Consequently, the number of transactions to be processed by S-mode secondary radars is becoming ever greater and these radars are ultimately getting saturated in precise azimuthal sectors with the standard algorithms. An unoptimal use of time by the transactions limits the possibilities of the radars with respect to this increase in air traffic. A more optimized use of time indeed will enable radars to process a greater number of transactions, and hence to correspond with a greater number of aircraft and increase the capacity of S-mode radars.

A known method of programing transactions consists, initially, of classifying the aircraft declared to be active according to their distance, in decreasing order, from the radar, selecting them according to criteria of priority and then positioning the listening windows so that each listening window is placed after ,the one corresponding to the aircraft which is at the immediately greater distance. If this arrangement becomes impossible, namely if the interrogation pulse associated with the last-placed window overlaps a previous window, then the entire transaction constituted by the interrogation pulse and the reception window is placed after the last previous window. This method of programming still leaves substantial periods of time unoccupied and therefore cannot meet the needs of an increase in the number of transactions processed by radar.

SUMMARY OF THE INVENTION

The aim of the present invention is to overcome the above-mentioned drawbacks, notably by modulating the reception windows and the interrogation pulses of the transactions to be placed.

To this end, an object of the invention is a method for the placing, in time, of transactions between a system of transmission/reception and targets that have underdone prior detection, a transaction $I_i$, $F_i$ being constituted by one or more interrogation pulses $I_i$ sent out by the system followed by one or more associated reception windows $F_i$ designed to receive the response from the target that has been sent the associated interrogation pulse $I_i$, the length of a transaction being defined by the delay between its pulse $I_i$ and its window $F_i$, the transactions being classified and positioned according to their lengths in the decreasing order, wherein the reception window $F_i$ of each transaction is placed immediately before the window $F_{i-1}$ of the immediately lower-ranking or lower-order transaction so long as its associated pulse $I_i$ does not overlap an interrogation pulse $I_{i-1}$ of a transaction in an immediately previous place and wherein, if the contrary is the case, the transaction $I_i$, $F_i$ is shifted within the previously-placed transactions, ,the interrogation pulse $I_i$ being placed at the earliest point in time until there is no longer any overlapping between its pulse $I_i$ or its window $F_i$ and an interrogation pulse or a reception window of these previously-placed transactions, the transaction $I_i$, $F_i$ being placed after all the previously-placed windows if a place without overlapping is not found in this way.

The main advantages of the invention are that it enables the placing of a maximum number of transactions in a given period of time, enables a significant increase in the performance characteristics of an S-mode radar station and is simple to implement and economical.

BRIEF DESCRIPTION OF THE DRAWINGS

Other features and advantages of the invention shall appear in the following description, made with reference to the appended drawings, in which.

DESCRIPTION OF THE INVENTION

Figure 1:
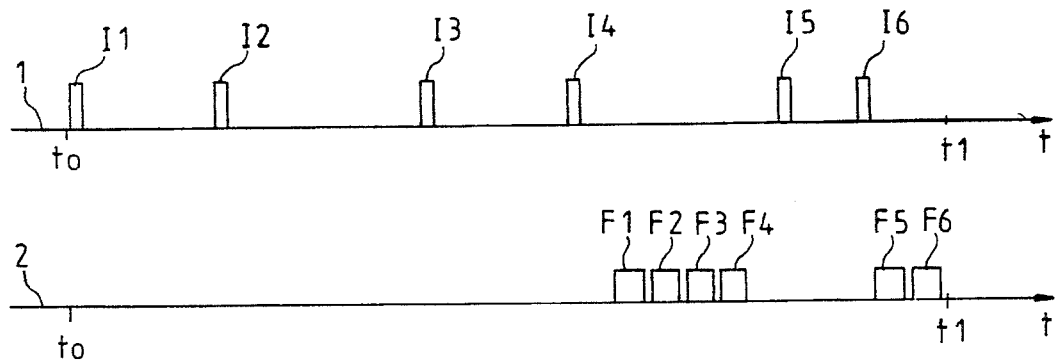
FIG. 1 shows a placing method according to the prior art.

FIG. 1 shows a method for the programming of transactions according to the prior art pertaining, by way of an example, to the placing in time of six transactions $I_1$, $F_1$, $I_2$, $F_2$, $I_3$, $F_3$, $I_4$, $F_4$, $I_5$, $F_5$, $I_6$, $F_6$. These six transactions are designed, for example, for six aircraft that have undergone preliminary detection by the secondary S-mode radar and have positions in space that, for example, have been predicted.

The interrogation pulses $I_1$, $I_2$, $I_3$, $I_4$, $I_5$, and $I_6$ are, for example, placed along a first axis 1 and the reception windows are placed along a second axis 2. However, these two axes represent the same time scale t and could therefore be overlapping. The rank or positional order of each transaction is a function of the distance between its corresponding aircraft and the transmission/reception system, with the above-mentioned S-mode secondary radar for example which sends out interrogation pulses and receives the responses from the detected targets, which are aircraft for example. The distance between the targets and the system is, for example, predicted according to methods known to those skilled in the art. The lowest-ranking transaction, $I_1$, $F_1$ is that corresponding to the aircraft furthest from the radar. A transaction having a lower rank than a given transaction corresponds to an aircraft at a greater distance from the radar than the one concerned by the given transaction. The length of a transaction $I_1$, $F_1$ which represents the delay between its interrogation pulse $I_1$ and its reception window $F_1$ is a function of the distance between the corresponding target and the system. The above-mentioned classification therefore amounts to a classification of the transactions according to the decreasing order of their distances from the radar. This is a classification for the order of processing of the transactions, namely for the order of their positioning, and not necessarily a classification according to the time axes 1, 2. In the case of the method of FIG. 1, the first transaction $I_1$, $F_1$ is fixed at a given initial instant to, the instant at which its pulse $I_1$ is programmed, and its window is placed accordingly. Indeed, the delay between an interrogation pulse $I_1$ and its associated window $F_1$ defines the length of the transaction as a function of the distance from its corresponding target to the transmission/reception system. Consequently, the shifting of the pulse or of the window dictates the placing of the other element of the transaction. Each listening window is placed immediately after the immediately lower-ranking window with a separation gap of some microseconds for example, until its associated pulse overlaps a previously-placed window, i.e. a lower-ranking window.

In the example of FIG. 1, the first four transactions $I_1$, $F_1$, $I_2$, $F_2$, $I_3$, $F_3$, $I_4$, $F_4$ are thus placed so that each window is placed immediately after the immediately lower-ranking window. The fifth window $F_5$ does not immediately follow the fourth window $F_4$ for, if not, its associated pulse $I_5$ would overlap the preceding windows. In this case, according to the method illustrated in FIG. 1, the fifth transaction $I_5$, $F_5$ is placed after all the previous windows, i.e. after the fourth window $F_4$. The fifth pulse $I_5$ is then placed after the fourth window $F_4$. For the rest of the operation, the sixth window is placed immediately after the fifth window $F_5$. This is possible in the example of FIG. 1 because the length of the sixth transaction $I_6$, $F_6$ is such that the sixth pulse does not overlap the fifth window $F_5$. The method of FIG. 1 makes it possible to place the six transactions presented in a period of time t1-to, the time t1 corresponding to the end of the sixth and last-placed window $F_6$.

Figure 2:
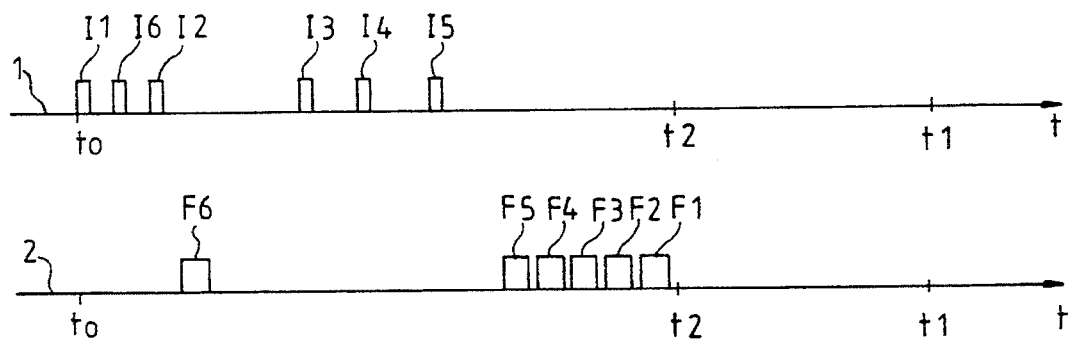
FIG. 2 shows a possible placing method according to the invention.

FIG. 2 illustrates a placing of these same six preceding transactions $I_1$, $F_1$, $I_2$, $F_2$, $I_3$, $F_3$, $I_4$, $F_4$, $I_5$, $F_5$, $I_6$, $F_6$ by a possible placing method according to the present invention.

The transactions are still processed according to their rank, the first transaction having the greatest length being placed before the second transaction and so forth.

According to the invention, a window is placed immediately before the immediately lower-ranking window with an interval of separation of some microseconds for example, the placing of the associated pulses being then dictated by the length of the transactions. This placing is done in this way until an overlapping appears between the window or interrogation pulse during the placing operation and a previously-placed pulse.

The term immediately means that no element of another lower-ranking transaction, namely an interrogation pulse or a reception window, is interposed between the elements to which it is applicable. Furthermore, the rank of a pulse or a window corresponds to the rank of the transaction in which it is located.

In the example shown in FIG. 2, the first five transactions can be placed in this way, each window being placed immediately before the immediately lower-ranking window.

However, the sixth window $F_6$ cannot be placed in this way for, otherwise, its associated pulse $I_6$ would overlap the fifth pulse $I_5$. According to the invention, when a window $F_6$ cannot be placed in this way, the transaction $I_6$, $F_6$ is shifted as soon as possible within the previous transactions, i.e. within the lower-ranking transactions $I_1$, $F_1$, $I_2$, $F_2$, $I_3$, $F_3$, $I_4$, $F_4$, $I_5$, $F_5$, $I_6$, $F_6$ until it can be placed without overlapping. If no placing is possible without overlapping, then the transaction $I_6$, $F_6$ is placed after all the previously-placed windows, namely after the window $F_1$ in the case of FIG. 2. The lengths of the transactions given as examples are, however, such that the sixth transaction $I_6$, $F_6$ can be placed within previous transactions, for example so that the sixth window $F_6$ is immediately placed after the second pulse $I_2$. The six transactions, which are the same as those of the exemplary placing of FIG. 1, are therefore placed between the initial instant to and an instant t2, this instant t2 corresponding to the end of the first window $F_1$.

The instant t2 is a lower-ranking instant than the preceding end-of-placing instant t1 of the example of FIG. 1. The six transactions have therefore been placed in a smaller period of time t2-to and therefore take up the time available for the transactions in a more optimal way, which means that for a given period of time it is possible to process a greater number of transactions.

Figure 3:
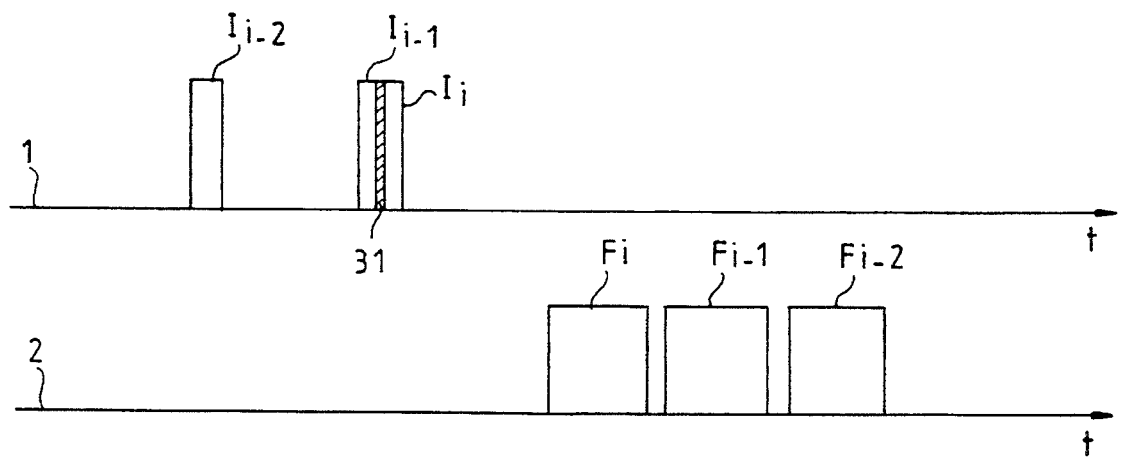
FIG. 3 shows an overlapping between two pulses.

FIGS. 3 to 7 illustrate a possible mode of placing a transaction within previous transactions when its window can no longer be placed immediately before the immediately lower-ranking window because of overlapping as in the case, for example, of the placing of the sixth window $F_6$ illustrated by FIG. 2. FIG. 3 shows the placing of three transactions taken from among others and having successive ranking values $I_{i-2}$, $F_{i-2}$, $I_{i-1}$, $F_{i-1}$, $I_i$, $F_i$, the i-2nd transaction $I_{i-2}$, $F_{i-2}$ having a length greater than the i-1st transaction $I_{i-1}$, $F_{i-1}$ which itself has a length greater than the i-th transaction $I_i$, $F_i$. The i-2nd transaction $I_{i-2}$, $F_{i-2}$ is placed before the i-1st transaction $I_{i-1}$, $F_{i-1}$ which is itself placed before the i-th transaction $I_i$, $F_i$. The i-2nd and i-1st transactions being placed, FIG. 3 illustrates the placing of the i-th transaction $I_i$, $F_i$.

This figure shows the case where the placing of a window $F_i$ immediately before the immediately lower-ranking window $F_{i-1}$ is no longer possible because of an overlapping 31 of an associated pulse $I_i$ with a previous pulse $I_{i-1}$. In the example of FIG. 3, the overlapping 31 occurs with the i-1st pulse $I_{i-1}$ associated with the i-1st immediately lower-ranking window $F_{i-1}$.

Following this overlapping 31, the placing of the i-th transaction $I_i$, $F_i$ inside previous transactions is done, for example, by successively placing the i-th transaction $I_i$, $F_i$ at the limits of the previously-placed transactions, starting from the interrogation of the earliest-placed transaction, i.e. the transaction with the lowest rank. These successive placing operations are done until there is no longer any overlapping between the elements of the i-th transaction, namely its interrogation pulse $I_i$ and its reception window $F_i$, and elements of the previously-placed transactions, namely previously-placed pulses or windows. As soon as a place without overlapping is found, the transaction $I_i$, $F_i$ is definitively placed.

FIGS. 4 to 7 illustrate examples of successive placing operations at the limits of a transaction having a rank i-k lower than the rank i of the i-th transaction $I_i$, $F_i$, the placing operations at the limits of the transactions with ranks lower than i-k having been unsuccessful because of overlapping. For clarity's sake, it is only the i-th transaction $I_i$, $F_i$ and the i-kth transaction $I_{i-k}$, $F_{i-k}$ that have been shown, it being possible for overlapping with elements of previously-placed transactions to occur.

Figure 4:
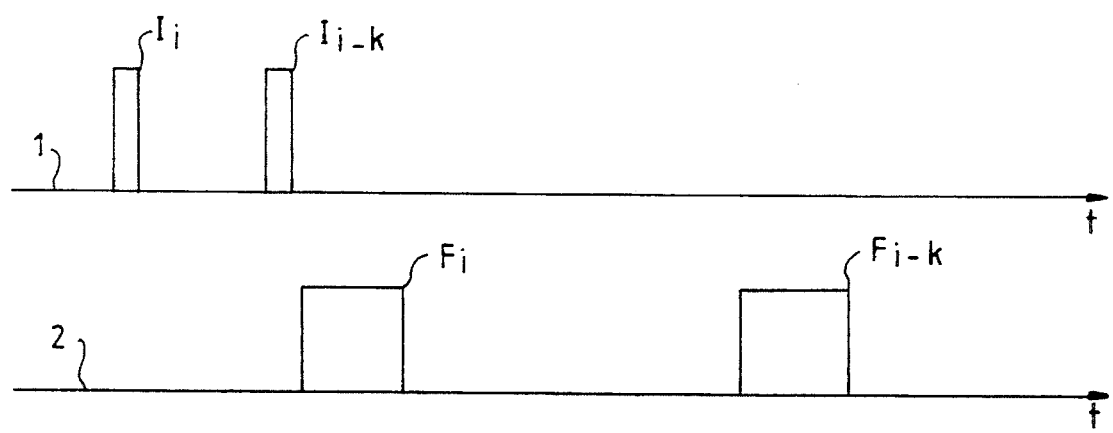
FIGS. 4 to 7 show a first possible mode of shifting a transaction within previously-placed transactions and with reference to a previously-placed transaction.

A first placing at the possible limits is shown in FIG. 4. The i-th window $F_i$ is placed immediately after the i-kth interrogation pulse $I_{i-k}$, the placing of its associated interrogation pulse $I_i$ being dictated by the length of the transaction $I_i$, $F_i$. Since the i-kth transaction $I_{i-k}$, $F_{i-k}$ has a lower rank than the i-th transaction $I_i$, $F_i$ the length of the i-kth transaction is greater than the length of the i-th transaction.

Figure 5:
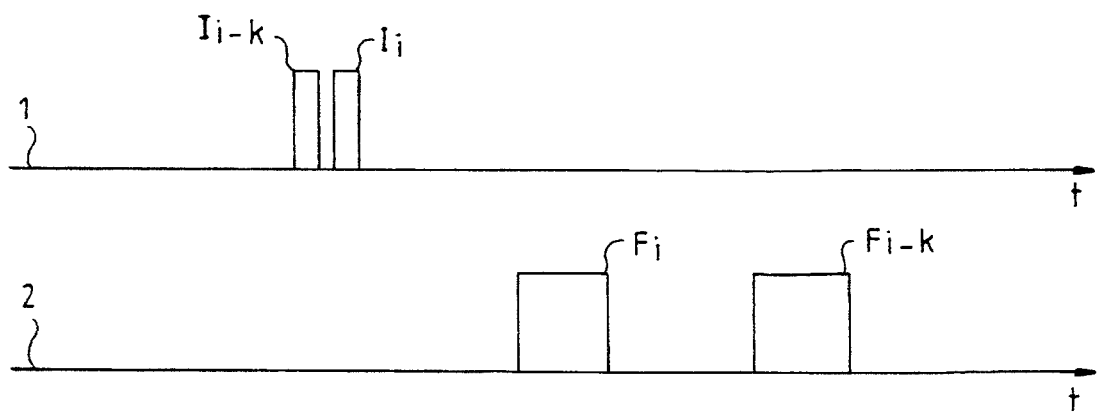

A second placing at the possible limits is shown in FIG. 5. The i-th interrogation pulse $I_i$ is placed immediately after the i-kth interrogation pulse $I_{i-k}$, the placing of its associated window, the i-th window $F_i$, being dictated by the length of the transaction $I_i,F_i$.

Figure 6:
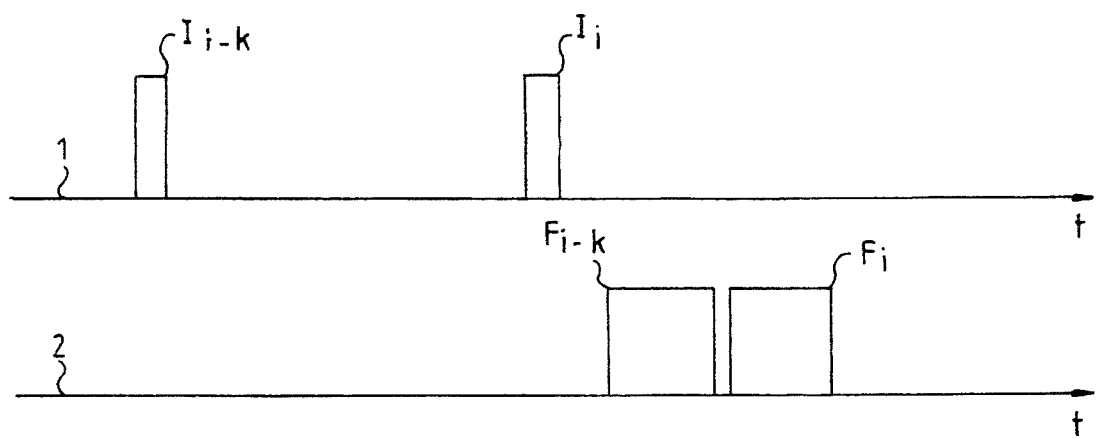

FIG. 6 illustrates a third placing at the possible limits. The i-th window $F_i$ is placed immediately after the i-kth window $F_{i-k}$, the placing of the i-th pulse being dictated by the length of the i-th transaction $I_i$, $F_i$.

Figure 7:
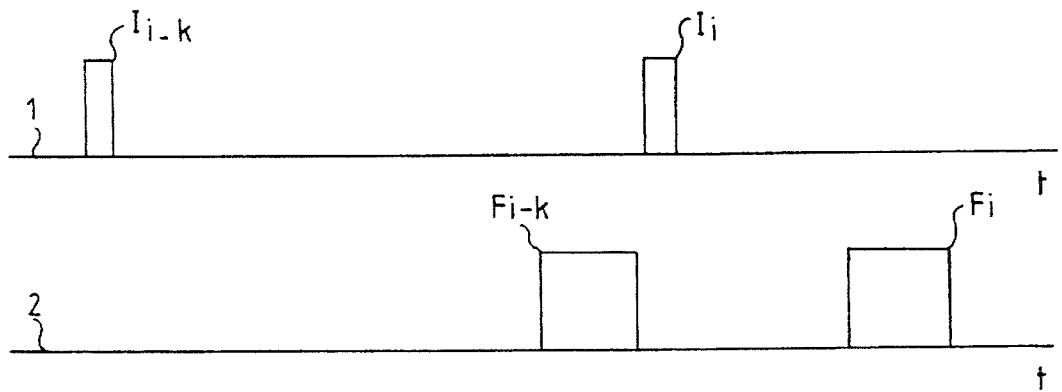

FIG. 7 illustrates a fourth placing at the possible limits. The i-th interrogation pulse $I_i$ is placed immediately after the i-kth window, the placing of the i-th window $F_i$ being dictated by the length of the i-th transaction.

Figure 8:
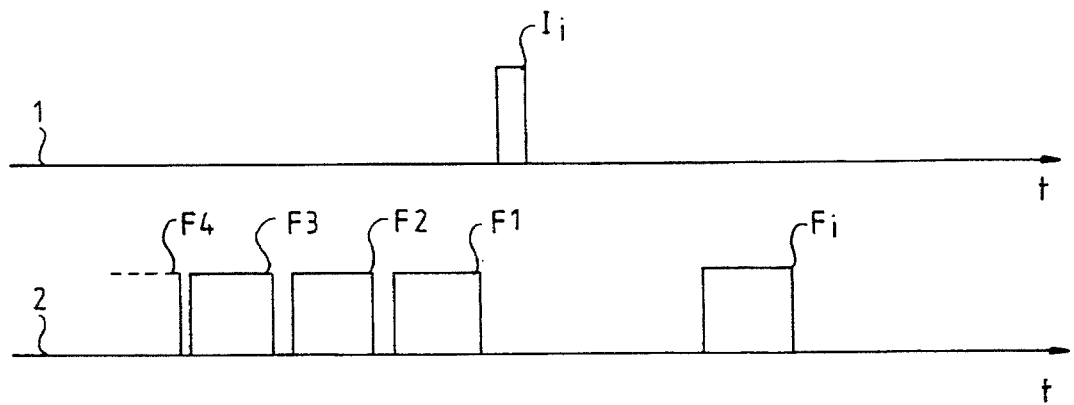
FIG. 8 shows the placing of a transaction when it can be placed inside previously-placed pulses.

If no placing at the limits of the previously-placed transactions can be done without overlapping, and if this is true for all the cases between the transactions i and the transaction i-k, where k belongs to the space [1(i-1)], then the transaction is placed after the previously-placed windows as is shown in FIG. 8. Since it has not been possible to place the i-th transaction $I_i$, $F_i$ within previous transactions following placing operations at the limits of these transactions, the i-th interrogation pulse $I_i$ is placed after the previously-placed windows $F_1$, $F_2$, $F_3$, $F_4$. The sequencing process can then be renewed in an identical way, the transaction $I_{i+1}$, $F_{i+1}$ being processed with respect to $I_i$, $F_i$ as $I_2$, $F_2$ had been placed with respect to $I_1$, $F_1$ and so on and so forth until there are no more transactions.

The operations of placing at the limits can be done according to one or more of the above-mentioned examples illustrated by FIGS. 4 to 7. A test of placing at the limits could, for example, follow the following steps from the highest-priority transaction to the lowest-priority transaction, this being done for all the transactions placed beginning with that of the lowest rank ($I_1$, $F_1$) until an absence of overlapping, if any, is detected:

in a first step, the reception window of the transaction being placed is placed immediately after the interrogation pulse of a previously-placed transaction as shown in FIG. 4;

in a second step, the interrogation pulse of the transaction being placed is placed after the interrogation pulse of the previously-placed transaction as shown in FIG. 5;

in a third step, the reception window of the transaction being placed is placed after the reception window of the previously-placed transaction as shown in FIG. 6;

in a fourth step, the interrogation pulse of the transaction being placed is placed after the reception window of the previous transaction as illustrated in FIG. 7;

these steps being carried out successively, starting with the earliest-placed transaction, namely the lowest-ranking transaction.

In the exemplary placing of FIG. 2, the sixth transaction $I_6$, $F_6$ had been placed so that the sixth window $F_6$ was placed immediately after the second pulse $I_2$, the sixth pulse $I_6$ then no longer overlapping any element of the previously-placed transactions $I_1$, $F_1$, $I_2$, $F_2$, $I_3$, $F_3$, $I_4$, $F_4$, $I_5$, $F_5$. Indeed, $I_6$ placed just after or just before $I_1$ is not appropriate here for $F_6$ overlaps $I_2$ and $F_6$ cannot be placed before or after $I_1$ because then $I_6$ is placed before to, the instant at which the selective interrogation period starts. Nor is $F_6$ before $I_2$ suitable because $I_6$ overlaps $I_1$.

In the exemplary operations of placing transactions at the limits shown in FIGS. 4 to 7, the elements of the transaction being placed, namely its interrogation pulse $I_i$ or its reception window $F_i$ are placed after the elements of the previously-placed transaction $I_{i-k}$, $F_{i-k}$.

Figure 9:
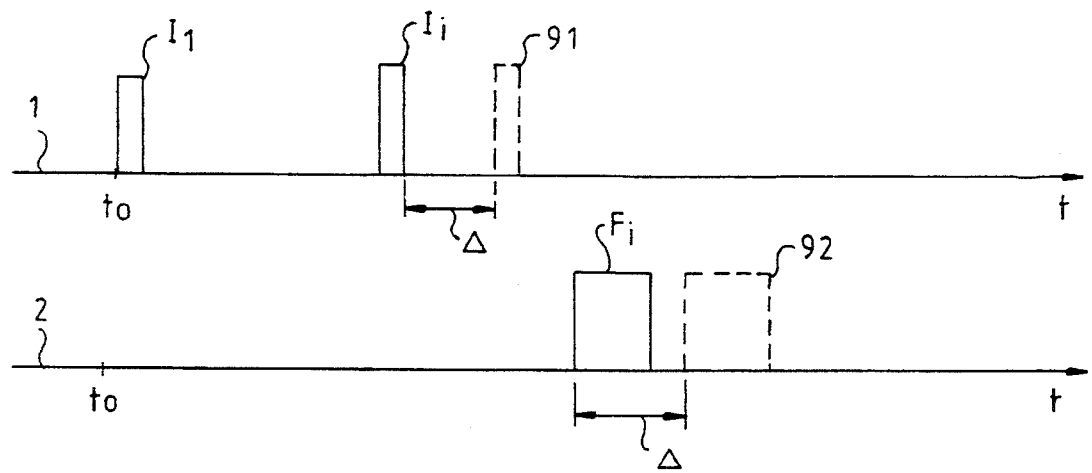
FIG. 9 shows a second possible mode of shifting a transaction within previously-placed transactions.

Other placing operations are possible, notably by placing the elements of the transaction in progress $I_i$, $F_i$ before the elements of the previously-placed transaction $I_{i-k}$, $F_{i-k}$. Thus four other operations of placing transactions at the possible limits may be the following ones:

the i-th window $F_i$ is placed immediately before the I-kth interrogation pulse $I_{i-k}$;

the i-th interrogation pulse $I_i$ is placed immediately before the I-kth pulse $I_{i-k}$;

the i-th window $F_i$ is placed immediately before the I-kth window $F_{i-k}$;

the i-the pulse $I_i$ is placed immediately before the I-kth window $F_{i-k}$;

FIG. 9 shows another possible mode of shifting a transaction, being placed, within previously-placed transactions. The transaction $I_i$, $F_i$ being placed is shifted within previous transactions, for example according to a pitch $\Delta$ starting from the pulse $I_1$ of the earliest-placed transaction, namely the lowest-ranking transaction.

A new position 91 is successively defined by the pitch $\Delta$ starting from the previous position of the interrogation pulse $I_i$, and similarly a new position 92 is successively defined by the pitch $\Delta$ starting from the previous position of the reception window $F_i$.

The pitch $\Delta$ is predetermined. It may be programmable for example.

Figure 10:
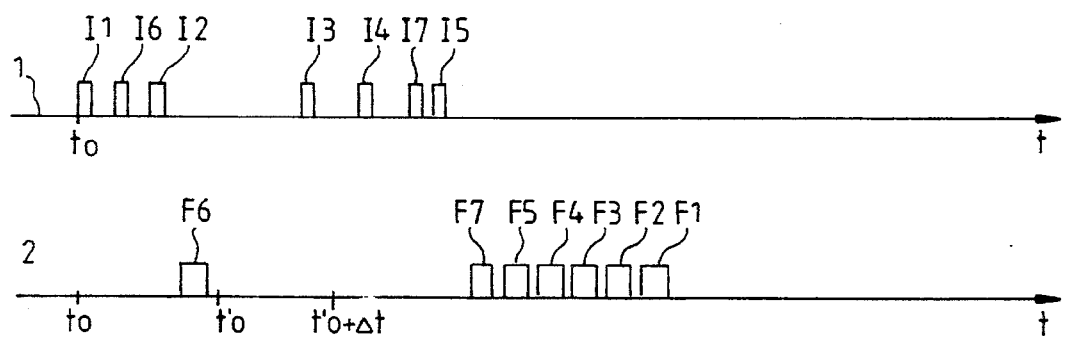
FIG. 10 shows a case where, with elements of placed transactions having already occurred, a new transaction has to be placed.

FIG. 10 illustrates a novel definition of the earliest instant when, at an instant t'o, the placing of transactions $I_1$, $F_1$, $I_2$, $F_2$, $I_3$, $F_3$, $I_4$, $F_4$, $I_5$, $F_5$, $I_6$, $F_6$ having been programmed and when, from an instant to, prior to t'o, elements $I_1$, $I_6$, $I_2$, $F_6$ of these transactions having actually occurred, it is decided to add on an additional transaction $I_7$, $F_7$. The already-placed transactions are, for example, placed in accordance with the example of FIG. 2. The time taken to program the placing of the additional transaction $I_7$, $F_7$ notably means that this transaction cannot really take place before an instant t'o+$\Delta$ after an instant t'o when it was decided to introduce it. The programming of the placing of this additional transaction $I_7$, $F_7$ is therefore done with the method according to the invention but with the initial instant of possible placing of the transaction $I_7$, $F_7$ being shifted to the later instant t'o+$\Delta$.

What is claimed is:

1. A method of communicating data between a transmission/reception center and a target, said data including transactions each of which consists of an interrogation pulse transmitted by said transmission/reception center and a reception window transmitted by said transmission/reception center which receives a response transmitted by said target, said method comprising the steps of:

(a) transmitting a plurality of interrogation pulses; and (b) transmitting a plurality of reception windows such that a reception window corresponding to a latest-transmitted interrogation pulse is transmitted immediately after said latest-transmitted interrogation pulse and the reception windows corresponding to the interrogation pulses transmitted before said latest-transmitted interrogation pulse are then transmitted in a reverse order to an order in which the interrogation pulses to which they correspond were transmitted, unless any of said reception windows overlaps any of said interrogation pulses in which case the reception window which overlaps the interrogation pulse and its corresponding interrogation pulse are transmitted at the earliest time for which no overlap occurs.

2. A method according to claim 1, wherein said latest-transmitted interrogation pulse and its corresponding reception window are successively shifted within the limits of previously placed transactions, beginning with an earliest-placed transaction.

3. A method according to claim 2, wherein the shifting of a transaction whose reception window overlaps an interrogation pulse includes at least one of the following steps:

(b-1) transmitting the reception window of the transaction immediately after a previously-transmitted interrogation pulse;

(b-2) transmitting the interrogation pulse of the transaction immediately after a previously-transmitted interrogation pulse;

(b-3) transmitting the reception window of the transaction immediately after a previously-transmitted reception window; and (b-4) transmitting the interrogation pulse of the transaction immediately after a previously-transmitted reception window.

4. A method according to claim 2, wherein the shifting of a transaction whose reception window overlaps an interrogation pulse includes at least one of the following steps:

(b-1-1) transmitting the reception window of the transaction immediately before a previously-transmitted interrogation pulse;

(b-1-2) transmitting the interrogation pulse of the transaction immediately before a previously-transmitted interrogation pulse;

(b-1-3) transmitting the reception window of the transaction immediately before a previously-transmitted reception window; and (b-1-4) transmitting the interrogation pulse of the transaction immediately before a previously-transmitted reception window.

5. A method according to claim 1, wherein said latest-transmitted interrogation pulse and its corresponding reception window are shifted within previously placed transactions according to a pitch beginning at the interrogation pulse of the earliest-placed transaction.

6. A method according to claim 1, wherein, after a plurality of transactions have been transmitted, a new transaction is transmitted within the limits of the previously placed transactions until there is no longer any overlapping between the new transaction and said previously placed transactions.

7. A method according to claim 1, wherein, after a plurality of transactions have been transmitted, a new transaction is transmitted by shifting, from an earliest point in time, within previously placed transactions, according to a pitch until there is no longer any overlapping between the new transaction and said previously placed transactions.

* * * * *